United States Patent
Masuda et al.

(10) Patent No.: US 12,190,910 B1
(45) Date of Patent: Jan. 7, 2025

(54) RECALLING DATA FROM TAPE

(71) Applicant: International Business Machines Corporation, Armonk, NY (US)

(72) Inventors: Setsuko Masuda, Tokyo (JP); Tsuyoshi Miyamura, Kanagawa-ken (JP); Tatsuki Sawada, Chiba (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/534,812

(22) Filed: Dec. 11, 2023

(51) Int. Cl.
| G11B 5/58 | (2006.01) |
| G11B 5/55 | (2006.01) |
| G11B 20/10 | (2006.01) |
| G11B 20/12 | (2006.01) |
| G11B 20/18 | (2006.01) |

(52) U.S. Cl.
CPC ...... *G11B 20/10388* (2013.01); *G11B 5/5508* (2013.01); *G11B 20/1204* (2013.01); *G11B 20/18* (2013.01)

(58) Field of Classification Search
CPC ....... G11B 5/54; G11B 15/06; G11B 5/59627; G11B 5/584; G11B 5/588; G11B 15/1808; G11B 15/00; G11B 33/14; G11B 33/1446
USPC ................................. 360/48, 77.12
See application file for complete search history.

(56) References Cited

U.S. PATENT DOCUMENTS

| 5,335,119 A | 8/1994 | Shih | |
| 7,269,987 B2 * | 9/2007 | Ollis | B21F 45/16 72/64 |
| 8,037,346 B2 * | 10/2011 | Katagiri | G06F 3/0617 714/6.13 |
| 8,213,102 B2 * | 7/2012 | Leopold, Jr. | G11B 15/20 360/53 |
| 2015/0055240 A1 | 2/2015 | Iwanaga | |
| 2020/0051592 A1 | 2/2020 | Yamamoto | |

FOREIGN PATENT DOCUMENTS

| EP | 1091299 A2 | 4/2001 |
| JP | 2008269700 A | 11/2008 |

OTHER PUBLICATIONS

"Recovering Data from a Physical Volume," (2021) IBM Corporation, 2pgs. https://www.IBM.com/docs/en/ts7700-virtual-tape/5.0?topic=recovering-data-from-physical-volume <Retrieved from internet on Sep. 13, 2023>.

* cited by examiner

*Primary Examiner* — Nabil Z Hindi
(74) *Attorney, Agent, or Firm* — Kelsey M Skodje (57) ABSTRACT

A system for recalling data from tape is disclosed. The system includes computer processing circuits and computer readable storage media having computer executable instructions. When executed, the instructions cause the computer-processing circuits to start, in response to a request to recall data from a tape, to read the tape at a read position. Additionally, the instructions cause the circuits to determine that the tape comprises a damaged region. Further, the instructions cause the circuits to determine a start position of the damaged region by skimming the tape. Additionally, the instructions cause the circuits to determine an end position of the damaged region by skimming the tape. Further, the instructions cause the circuits to read between the read position and the start position of the damaged region. Additionally, the instructions cause the circuits to read between the end position of the damaged region and an end of data indicator.

20 Claims, 3 Drawing Sheets

RECALLING DATA FROM TAPE

BACKGROUND

The present disclosure relates to recalling data, and more specifically, to recalling data from tape.

In some computer systems, a linear tape file system (LTFS) can provide access to files stored on tape cartridges through an interface of the file system. The LTFS can store data on a tape cartridge in a form according to the LTFS format, which is an open-source specification, and implemented by many vendors.

An LTFS can provide access to files stored on tape storage, such as tape cartridges. Tape cartridges may be useful for storing backup copies of files stored on disk. However, in some cases, these backup copies may be accidentally overwritten, or the data may become unreadable. Additionally, in some cases, the tapes used to store these backup copies may be physically broken. In other words, the tape itself may be cut, or otherwise damaged. As such, it may be challenging to access data stored in a region of the tape that is located "beyond" the damaged region. In this context, beyond makes reference to the direction a tape drive is reading a tape. Thus, as the tape drive rotates the tape, and reads the data on the tape in a particular direction, the tape drive may encounter a cut, and stop reading the tape. As such, any data written on tape on the other side of (e.g., beyond) the cut may not be read.

SUMMARY

Embodiments are disclosed for a system. The system includes a computer processing circuit and a computer-readable storage medium storing instructions, which, when executed by the computer processing circuit, are configured to cause the computer processing circuit to perform a method in response to a request to recall data from a tape. The method includes starting to read a tape at a read position. Additionally, the method includes determining that the tape includes a damaged region. Further, the method includes determining a start position of the damaged region by skimming the tape. Additionally, the method includes determining an end position of the damaged region by skimming the tape. Further, the method includes reading between the read position and the start position of the damaged region. Additionally, the method includes reading between the end position of the damaged region and an end of data indicator for the data. In these ways, such embodiments can reduce the time, financial, and other resources used on retrieving data that is overwritten, or otherwise unreadable due to tape damage. Additionally, such embodiments may improve the technology of tape drives by reducing the amount of damage to tapes from which such data is retrieved.

Embodiments are disclosed for a system. The system includes a computer processing circuit and a computer-readable storage medium storing instructions, which, when executed by the computer processing circuit, are configured to cause the computer processing circuit to perform a method in response to a request to recall data from a tape. The method includes starting to read a tape at a read position. Additionally, the method includes determining that the tape includes a damaged region. Further, the method includes determining a start position of the damaged region by skimming the tape. Additionally, the method includes determining an end position of the damaged region by skimming the tape. Further, the method includes reading between the read position and the start position of the damaged region. Additionally, the method includes reading between the end position of the damaged region and an end of data indicator for the data. Further, the method includes determining the read position based on a parameter of the request to recall data. In these ways, such embodiments can reduce the time, financial, and other resources used on retrieving data that is overwritten, or otherwise unreadable due to tape damage. Additionally, such embodiments may improve the technology of tape drives by reducing the amount of damage to tapes from which such data is retrieved.

Embodiments are disclosed for a method. The method includes, in response to a request to recall data from a tape, starting to read a tape at a read position. Additionally, the method includes determining that the tape includes a damaged region. Further, the method includes determining a start position of the damaged region by skimming the tape. Additionally, the method includes determining an end position of the damaged region by skimming the tape. Further, the method includes reading between the read position and the start position of the damaged region. Additionally, the method includes reading between the end position of the damaged region and an end of data indicator for the data. In these ways, such embodiments can reduce the time, financial, and other resources used on retrieving data that is overwritten, or otherwise unreadable due to tape damage. Additionally, such embodiments may improve the technology of tape drives by reducing the amount of damage to tapes from which such data is retrieved.

Embodiments are disclosed for a method. The method includes a computer processing circuit and a computer-readable storage medium storing instructions, which, when executed by the computer processing circuit, are configured to cause the computer processing circuit to perform a method in response to a request to recall data from a tape. The method includes starting to read a tape at a read position. Additionally, the method includes determining that the tape includes a damaged region. Further, the method includes determining a start position of the damaged region by skimming the tape. Additionally, the method includes determining an end position of the damaged region by skimming the tape. Further, the method includes reading between the read position and the start position of the damaged region. Additionally, the method includes reading between the end position of the damaged region and an end of data indicator for the data. Further, the method includes determining the read position based on a parameter of the request to recall data. In these ways, such embodiments can reduce the time, financial, and other resources used on retrieving data that is overwritten, or otherwise unreadable due to tape damage. Additionally, such embodiments may improve the technology of tape drives by reducing the amount of damage to tapes from which such data is retrieved.

Embodiments are disclosed for a computer program product. The computer program product includes one or more computer readable storage media, and program instructions collectively stored on the computer readable storage media. Additionally, the program instructions are configured to cause one or more processors to perform a method. The method includes, in response to a request to recall data from a tape, starting to read a tape at a read position. Additionally, the method includes determining that the tape includes a damaged region. Further, the method includes determining a start position of the damaged region by skimming the tape. Additionally, the method includes determining an end position of the damaged region by skimming the tape. Further, the method includes reading between the read position and the start position of the damaged region. Additionally, the method includes reading between the end position of the damaged region and an end of data indicator for the data. In these ways, such embodiments can reduce the time, financial, and other resources used on retrieving data that is overwritten, or otherwise unreadable due to tape damage. Additionally, such embodiments may improve the technology of tape drives by reducing the amount of damage to tapes from which such data is retrieved.

Embodiments are disclosed for a computer program product. The computer program product includes one or more computer readable storage media, and program instructions collectively stored on the computer readable storage media. Additionally, the program instructions are configured to cause one or more processors to perform a method. The method includes a computer processing circuit and a computer-readable storage medium storing instructions, which, when executed by the computer processing circuit, are configured to cause the computer processing circuit to perform a method in response to a request to recall data from a tape. The method includes starting to read a tape at a read position. Additionally, the method includes determining that the tape includes a damaged region. Further, the method includes determining a start position of the damaged region by skimming the tape. Additionally, the method includes determining an end position of the damaged region by skimming the tape. Further, the method includes reading between the read position and the start position of the damaged region. Additionally, the method includes reading between the end position of the damaged region and an end of data indicator for the data. Further, the method includes determining the read position based on a parameter of the request to recall data. In these ways, such embodiments can reduce the time, financial, and other resources used on retrieving data that is overwritten, or otherwise unreadable due to tape damage. Additionally, such embodiments may improve the technology of tape drives by reducing the amount of damage to tapes from which such data is retrieved.

The present summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the present disclosure is amenable to various modifications and alternative forms, specifics thereof have been shown by way of example in the drawings and will be described in detail. It should be understood, however, that the intention is not to limit the present disclosure to the embodiments described. On the contrary, the intention is to cover all modifications, equivalents, and alternatives falling within the spirit and scope of the present disclosure.

DETAILED DESCRIPTION

As stated previously, tape cartridges may include backup copies of data that may be accidentally overwritten, or where the data may become unreadable. With respect to overwritten data and unreadable data, tape drives may have the capability to read data from overwritten tape, and to read otherwise unreachable data on tapes which have unreadable data. With respect to overwritten tape, for example, new data may be written over a portion of old data. As such, using specific commands, it may be possible to read the old data that still remains after the end of the newly written data. For example, a tape drive interface, may include commands that can read across the end of data (EOD), and read across error (RXE). However, some of these commands may be constrained in how the tape drive positions the tape for reading. For example, such commands may use a record number, file number, filemark number, or other like references to the location on tape where data is stored. This number, or other reference, may be maintained in a tape directory, which maps record/file numbers to storage locations. However, once overwritten, this mapping may be deleted from the tape directory. As such, the record/file numbers may not be useful for determining the storage location of overwritten data.

As such, it may not be possible, using such commands, to position the tape to a predetermined (e.g., specific) position (e.g., wrap and longitudinal position, segment number, and the like). The wrap and longitudinal position (WLPOS) identifies a specific position on the tape where overwritten data (in this case) may be stored. The wrap refers to a specific track on the tape. Tape drives read and write data in a longitudinal direction in a track. The tape includes multiple tracks. Thus, when the tape drive reaches the end of the tape, the tape drive can change the track of the read/write head, begin moving the tape in the opposite direction, and resume reading, writing, and/or rotating the tape. Further, this sequence may repeat each time the tape drive reaches either extreme of the tape. While these commands may still be useful for finding overwritten data, and the like, the amount of time involved in finding the data (e.g., the latency) may increase, which may have a cascading effect on other applications trying to access the tape.

Additionally, the tape drive may change direction when it receives a command, such as a LOCATE or SPACE command, which requests that the tape drive move the tape to another position. Typically, when tape drive receives LOCATE/SPACE request, the tape drive rotates the tape to a specific LPOS and move the head near the desired data (e.g., the wrap) and starts reading. However, without the record or file number, the tape drive cannot determine where the data is without reading the entire tape. Therefore, the tape drive may read all data on the tape from the current position until reaching the requested data, which increases the latency of the response to the request for data.

With respect to broken tapes, the relevant data is still in the tape directory. As such, it is possible to identify the specific location on tape where the relevant data is stored. Additionally, the tape itself may also store metadata about the data stored thereon. For example, such metadata may include the number of records written in each segment of the tape. Thus, to gain efficiencies in the latency of access, the tape drives may treat the tape as being divided into some number (e.g., a power of 2) of equally sized segments in the longitudinal direction of the tape. Thus, with a 128 (i.e., $2^7$) segment tape, if the tape drive read/write head is positioned at the beginning of the tape, and has a command to read data in the $128^{th}$ segment, instead of reading through most of the tape to find the data, the tape drive may rotate past the first 127 segments before starting to look for the data. Such a directory may be referred to as a high resolution tape directory (HRTD). However, if the requested data is stored in a tape segment with a damaged position, the tape drive cannot reach any data stored beyond the damaged position because any attempt to read from the damaged position can cause the read/write head to trigger an error condition to the tape drive, which may cause the tape drive to stop rotating the tape. However, the tape drive is still capable of reading data in segments without damage.

The implications of damage to the tape include the loss of relatively large amounts of data, not to mention storage space. For example, if the length of one HRTD region is 8 meters (which may store 800 megabytes (MB)), the length of a dataset may be about 10 cm. A dataset is a chunk of records that is generated by a tape drive to write data to tape. The size of one dataset may be constant, about 10 MB, regardless of the length of HRTD. However, the damage to the data in that one 10 megabyte dataset may make any data beyond the damage unreadable by the typical read command. In a worst case scenario, this may make 790 MB of data unreadable.

There are some commands, such as a read across error (RXE), which may perform repeat skimming of the tape to detect the position to start reading. However, repeat skimming may bring the read/write head repeatedly into contact with the damaged position of the tape, which may lead to further damage. Due to such constraints, the process for retrieving (a.k.a. rescuing) data from a damaged tape may differ depending on the location and size of the damage. Accordingly, retrieval may include repetitive, manual, positioning, reading, repositioning, reading, and so on, until all data is restored. Such efforts may be time intensive, relatively costly, and constrain additional resources.

Accordingly, some embodiments of the present disclosure can make it possible to use an existing tape drive command with an additional parameter for a physical position on tape. In this way, the tape drive may rotate the tape, and move the read/write head, to the specified WLPOS and start reading data that may be overwritten (or otherwise unreadable) due to tape damage. In such embodiments, the tape drive may perform skimming at a specified position, determine the wrap and LPOS of the beginning and end of the damage, move the tape to a position beyond the damaged area, and start reading the tape. Some embodiments may determine the WLPOS of the beginning and end of the damage using metadata stored in a cartridge memory or other such directory. Further, in such embodiments, specifying the wrap and longitudinal positions of the end of the damaged area of the tape can cause the tape drive to position the tape where the read/write head is positioned in an area beyond the damage, and without skimming. In these ways, such embodiments can reduce the time, financial, and other resources used on retrieving data that is overwritten, or otherwise unreadable due to tape damage. Additionally, such embodiments may improve the technology of tape drives by reducing the amount of damage to tapes from which such data is retrieved. However, some embodiments of the present disclosure may not achieve such advantages.

Figure 1:
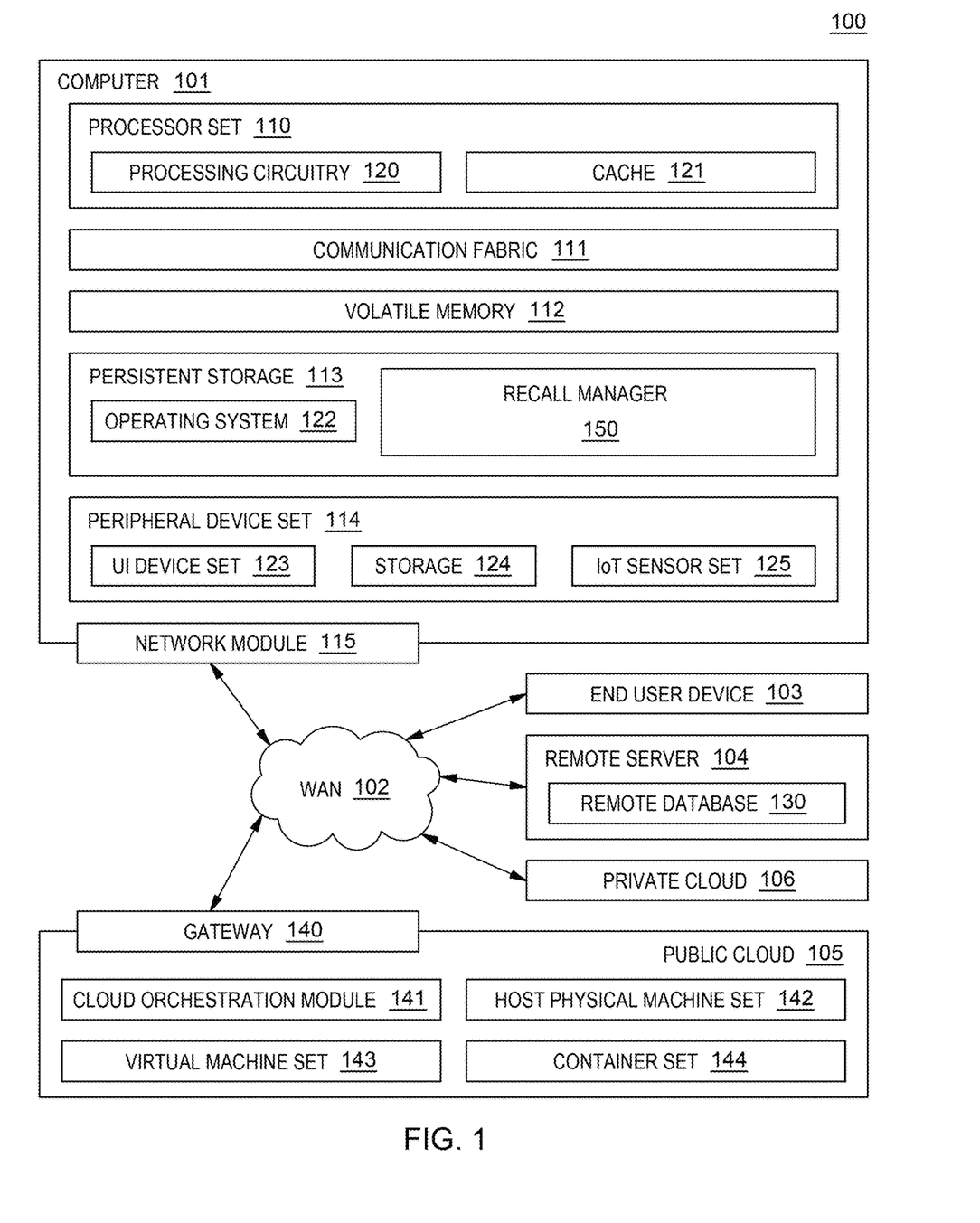
FIG. 1 is a block diagram of an example computing environment, in accordance with some embodiments of the present disclosure.

FIG. 1 is a block diagram of an example computing environment 100, in accordance with some embodiments of the present disclosure. Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as recall manager 150. In addition, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and recall manager 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in recall manager 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in recall manager 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
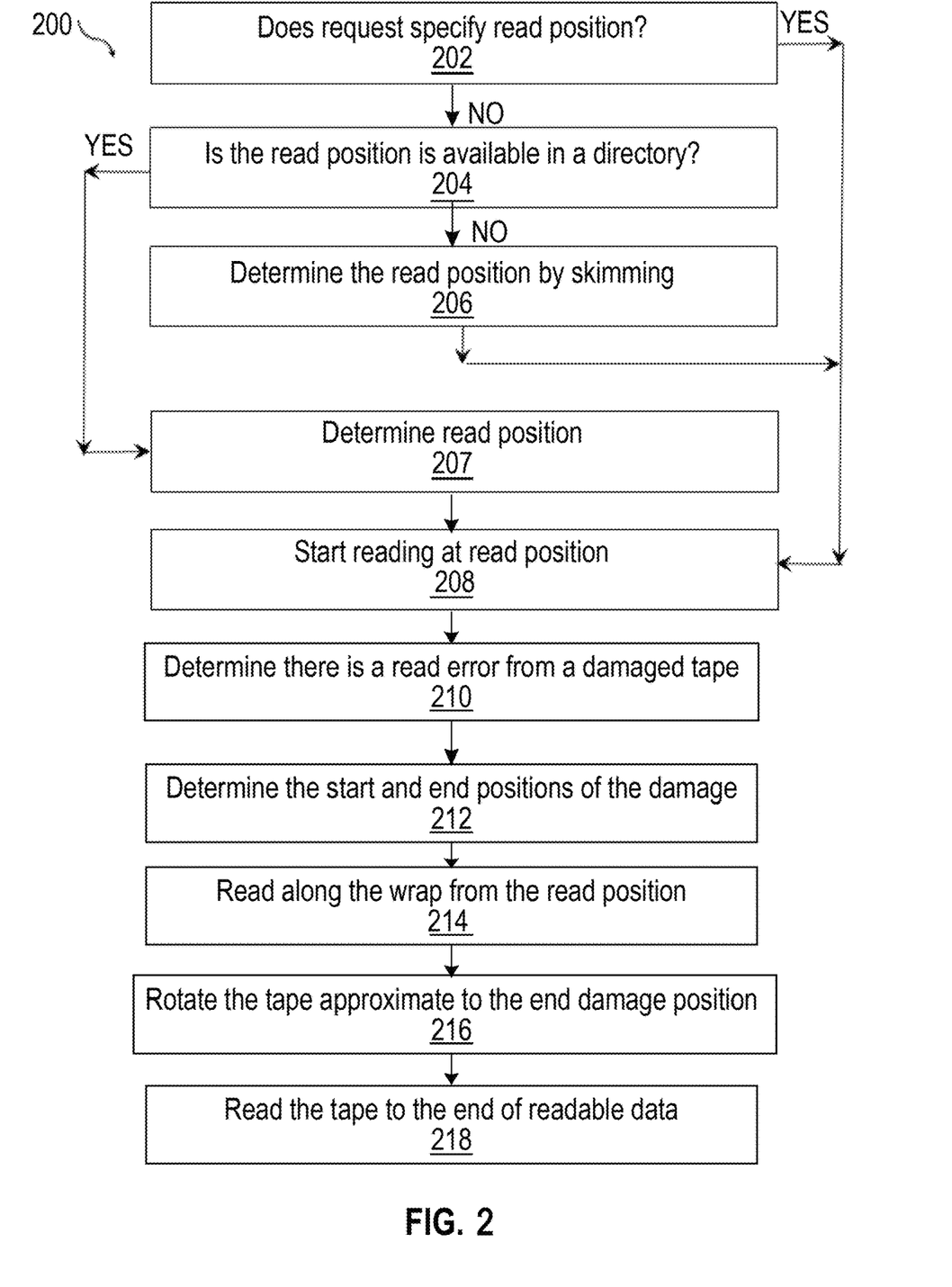
FIG. 2 is a process flow chart of a method for recalling data from tape, in accordance with some embodiments of the present disclosure.

FIG. 2 is a flow chart of a process 200 for recalling data from tape, in accordance with some embodiments of the present disclosure. In some embodiments, a read recall manager, such as the recall manager 150 described with respect to FIG. 1, can perform the process 200.

At operation 202, the recall manager 150 may determine if a data request specifies a read position. The process begins where the recall manager 150 determines if a data request specifies a read position. If the request specifies a read position, the process proceeds to operation 208. Otherwise, the process 200 proceeds to operation 204.

At operation 204, the recall manager 150 may determine if the read position is available in a directory. More specifically, the recall manager may determine if the read position is available in a tape directory, a cartridge memory, and the like. If the read position is available, the process 200 proceeds to operation 207. However, if the read position is not available, the process proceeds to operation 206.

At operation 207, the recall manager 150 may determine the read position. Determining the read position may involve reading the tape directory, a cartridge, manager, or the like. The tape directory may include a mapping of record/file numbers to tape positions. As such, if the tape directory includes an entry for the requested record/file number, the recall manager may determine the read position from the mapping in the tape directory for the requested record/file number. Alternatively, the recall manager 150 may determine if the cartridge memory includes an address for the requested record/file number.

At operation 206, the recall manager 150 may determine the read position by skimming. In some cases, it may not be possible to determine the read position from the tape directory because the record/file number may be overwritten. However, even in cases where the tape directory includes an entry for the record/file number, it may not be possible to uniquely determine the read position. For example, the tape directory may store the read position of the last dataset on each wrap of the tape. Additionally, the read position may be incremented when the dataset is rewritten or overwritten. As such, when rewriting or overwriting occurs multiple times on a wrap, the read position of the dataset on that wrap cannot be uniquely determined. For example, if the read position of the last dataset on wrap number 0 is at the 10 cm position, and if the read position of the last dataset on wrap 1 is at the 20 cm position, the read position of the dataset located in the middle of wrap 1 can be anywhere from 11 cm to 20 cm. Accordingly, in these and similar cases where the read position cannot be determined, the recall manager 150 may start skimming from the current position until the read position can be determined. Skimming to determine the read position may involve reading the tape, and determining at specific intervals whether the data stored there is the data requested.

At operation 208, the recall manager 150 may start reading at the specified or determined read position. The read position may be a wrap and LPOS. Alternatively, the read position may be a region/segment number of a high resolution tape directory, or the like. In some embodiments, the read position may be represented as a range of values, indicating beginning and end positions of a tape read. If the file being read has been overwritten, the read position may be determined from a memory dump, or the like. Starting reading at the read position may involve the recall manager 150 positioning the tape at a specific wrap and LPOS, segment number, or otherwise specified and/or determined position.

At operation 210, the recall manager 150 may determine if the tape drive encountered a read error from a damaged tape. If the read/write head reads a damaged portion of tape, the operating system of the tape drive may return an error condition indicating there is damage to the tape at this position. If the tape drive encounters a read error from a damaged tape, process 200 proceeds to operation 212. If not, the tape drive may continue reading the tape until the EOD.

At operation 212, the recall manager 150 may determine the start and end positions of the damage. Additionally, the recall manager 150 may store the start and end positions in a cartridge memory. The start position may be the position, or an approximate position, where the read attempt returned the error indicating tape damage. Additionally, determining the end position of the damage may involve skimming the tape. As stated previously, skimming may increase wear on the tape. However, embodiments may skim the damaged portion one time to determine the span of damage. Further, the start and end positions may be stored in a cartridge memory, or with other metadata. Thus, a subsequent read may avoid skimming the damaged portion by determining the start and end positions from the cartridge memory before positioning the tape for the read. In contrast, current systems may skim the damaged tape for multiple read attempts. In this way, embodiments of the present disclosure represent an improvement over current systems, by reducing the amount of wear on already-damaged tape.

At operation 214, the recall manager 150 may read along the wrap from the determined read position. Additionally, the recall manager 150 may read the tape up the end of readable data on the current side of the damage. Reading up to the end of readable data can involve reading from the determined read position until a position approximate to the damage. Reading up to an approximate position, instead of the actual position of damage, may avoid a potential read error and/or skim, against a damaged portion of the tape.

Additionally, the recall manager 150 may change the wrap, reverse the direction of the tape rotation, and read the tape in the reverse direction. If, upon reading in the reverse direction, the tape approaches the end of data, process 200 proceeds to operation 216. Alternatively, if the tape drives reads to the extreme of the tape, some embodiments of the present disclosure may stop the tape, change the wrap, reverse the rotation, and read to the position approximate to the start of the damage. This process may repeat until the EOD, or until the last byte of the data record stored on this side of the damaged portion is read.

At operation 216, the recall manager 150 may rotate the tape to a position approximate to the end position of the damage. Similar to the start position, the recall manager 150 may avoid reading the actual end position of damage (and corresponding error), by positioning the tape at a position beyond, and approximate to the end of the damage.

At operation 218, the recall manager 150 may read the tape from the current position to the end of readable data. Reading to the end of readable data may involve reading until the EOD. Alternatively, reading to the end of readable data may involve reading until an extreme of the tape, changing the wrap, reversing the direction of rotation, and reading in the reverse direction. If, upon reading in the reverse direction, the tape approaches the end position of damage, some embodiments of the present disclosure may stop the tape, change the wrap, reverse the rotation, and read to the extreme of the tape. This process may repeat until the EOD, or, until the last byte of the data record stored on the current side of the damaged portion is read.

Figure 3:
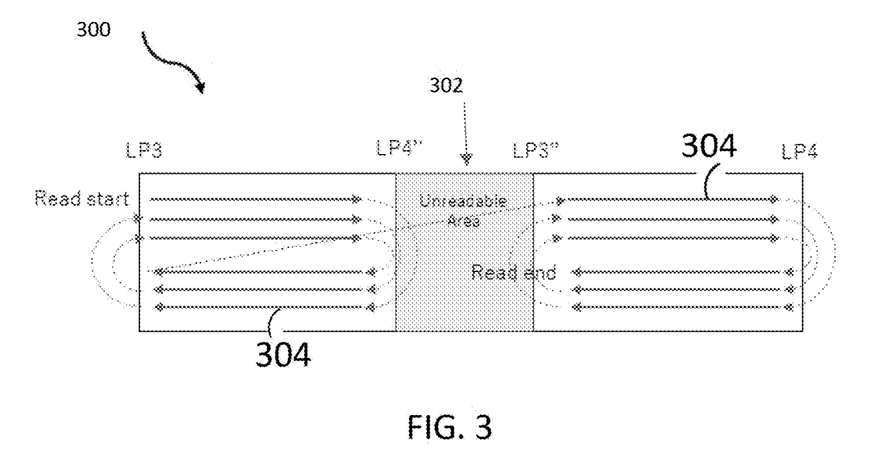
FIG. 3 is a block diagram of an example damaged tape, in accordance with some embodiments of the present disclosure.

FIG. 3 is a block diagram of an example damaged tape 300, in accordance with some embodiments of the present disclosure. The damaged tape includes a starting read position, labeled LP3, an end read position, labeled LP4, a damaged region 302, bounded by positions labeled, LP3" and LP4", and wraps 304.

In the case of an undamaged tape, the tape drive reads out data while the tape goes back and forth between LP3 and LP4. Going back and forth involves, reading along the top wrap, until reaching point LP4. The tape drive moves to the next wrap, and reads in the opposite direction back to position LP3. This process repeats until all the data is read.

However, in the case of a damaged tape, the recall manager 150 may store the LP3" and LP4" positions so that the tape drive can turn back at the damaged region 302. As stated previously, the recall manager 150 may detect the boundary positions at which the tape drive can read out the data.

The tape drive may read back and forth between LP3 and LP4" to read out the data, and after having reached the final wrap, goes back and forth between LP3" and LP4 to read out the rest of the data. In this example, the read data is not continuous when the wrap changes at LP3" and LP4", and accordingly the continuity check is not performed.

The present invention may be a system, a method, and/or a computer program product at any possible technical detail level of integration. The computer program product may include a computer readable storage medium (or media) having computer readable program instructions thereon for causing a processor to carry out aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A non-limiting list of examples are provided hereinafter to demonstrate some aspects of the present disclosure. Example 1 is a system. The system includes a computer processing circuit; and a computer-readable storage medium storing instructions, which, when executed by the computer processing circuit, are configured to cause the computer processing circuit to perform a method including: in response to a request to recall data from a tape: starting to read the tape at a read position; determining that the tape includes a damaged region; determining a start position of the damaged region by skimming the tape; determining an end position of the damaged region by skimming the tape; reading between the read position and the start position of the damaged region; and reading between the end position of the damaged region and an end of data indicator for the data. such embodiments can reduce the time, financial, and other resources used on retrieving data that is overwritten, or otherwise unreadable due to tape damage. Additionally, such embodiments may improve the technology of tape drives by reducing the amount of damage to tapes from which such data is retrieved.

Example 2 includes the system of example 1, including or excluding optional features. In this example, the method includes determining the read position based on a parameter of the request to recall data. such embodiments can reduce the time, financial, and other resources used on retrieving data that is overwritten, or otherwise unreadable due to tape damage. Additionally, such embodiments may improve the technology of tape drives by reducing the amount of damage to tapes from which such data is retrieved.

Example 3 includes the system of any one of examples 1 to 2, including or excluding optional features. In this example, the method includes determining the read position based on a data identifier and a tape directory that maps the data identifier to a position of the tape. such embodiments can reduce the time, financial, and other resources used on retrieving data that is overwritten, or otherwise unreadable due to tape damage. Additionally, such embodiments may improve the technology of tape drives by reducing the amount of damage to tapes from which such data is retrieved.

Example 4 includes the system of any one of examples 1 to 3, including or excluding optional features. In this example, the method includes determining that the read position is not valid; and determining the read position by skimming the tape. such embodiments can reduce the time, financial, and other resources used on retrieving data that is overwritten, or otherwise unreadable due to tape damage. Additionally, such embodiments may improve the technology of tape drives by reducing the amount of damage to tapes from which such data is retrieved.

Example 5 includes the system of any one of examples 1 to 4, including or excluding optional features. In this example, the method includes determining that the request to recall data does not specify the read position; determining that the read position is not available in a tape directory; and determining the read position by skimming the tape. such embodiments can reduce the time, financial, and other resources used on retrieving data that is overwritten, or otherwise unreadable due to tape damage. Additionally, such embodiments may improve the technology of tape drives by reducing the amount of damage to tapes from which such data is retrieved.

Example 6 includes the system of any one of examples 1 to 5, including or excluding optional features. In this example, the read position includes a wrap and a longitudinal position. such embodiments can reduce the time, financial, and other resources used on retrieving data that is overwritten, or otherwise unreadable due to tape damage. Additionally, such embodiments may improve the technology of tape drives by reducing the amount of damage to tapes from which such data is retrieved.

Example 7 includes the system of any one of examples 1 to 6, including or excluding optional features. In this example, the read position includes a segment number, where the tape includes a plurality of segments. such embodiments can reduce the time, financial, and other resources used on retrieving data that is overwritten, or otherwise unreadable due to tape damage. Additionally, such embodiments may improve the technology of tape drives by reducing the amount of damage to tapes from which such data is retrieved.

Example 8 includes the system of any one of examples 1 to 7, including or excluding optional features. In this example, the method includes determining the segment number based on a high resolution tape directory. such embodiments can reduce the time, financial, and other resources used on retrieving data that is overwritten, or otherwise unreadable due to tape damage. Additionally, such embodiments may improve the technology of tape drives by reducing the amount of damage to tapes from which such data is retrieved.

Example 9 is a method. The method includes in response to a request to recall data from a tape: starting to read the tape at a read position; determining that the tape includes a damaged region; determining a start position of the damaged region by skimming the tape; determining an end position of the damaged region by skimming the tape; reading between the read position and the start position of the damaged region; and reading between the end position of the damaged region and an end of data indicator for the data. such embodiments can reduce the time, financial, and other resources used on retrieving data that is overwritten, or otherwise unreadable due to tape damage. Additionally, such embodiments may improve the technology of tape drives by reducing the amount of damage to tapes from which such data is retrieved.

Example 10 includes the method of example 9, including or excluding optional features. In this example, the method includes determining the read position based on a parameter of the request to recall data. such embodiments can reduce the time, financial, and other resources used on retrieving data that is overwritten, or otherwise unreadable due to tape damage. Additionally, such embodiments may improve the technology of tape drives by reducing the amount of damage to tapes from which such data is retrieved.

Example 11 includes the method of any one of examples 9 to 10, including or excluding optional features. In this example, the method includes determining the read position based on a data identifier and a tape directory that maps the data identifier to a position of the tape. such embodiments can reduce the time, financial, and other resources used on retrieving data that is overwritten, or otherwise unreadable due to tape damage. Additionally, such embodiments may improve the technology of tape drives by reducing the amount of damage to tapes from which such data is retrieved.

Example 12 includes the system of any one of examples 9 to 11, including or excluding optional features. In this example, the method includes determining that the read position is not valid; and determining the read position by skimming the tape. such embodiments can reduce the time, financial, and other resources used on retrieving data that is overwritten, or otherwise unreadable due to tape damage. Additionally, such embodiments may improve the technology of tape drives by reducing the amount of damage to tapes from which such data is retrieved.

Example 13 includes the method of any one of examples 9 to 12, including or excluding optional features. In this example, the method includes determining that the request to recall data does not specify the read position; determining that the read position is not available in a tape directory; and determining the read position by skimming the tape. such embodiments can reduce the time, financial, and other resources used on retrieving data that is overwritten, or otherwise unreadable due to tape damage. Additionally, such embodiments may improve the technology of tape drives by reducing the amount of damage to tapes from which such data is retrieved.

Example 14 includes the method of any one of examples 9 to 13, including or excluding optional features. In this example, the read position includes a wrap and a longitudinal position. such embodiments can reduce the time, financial, and other resources used on retrieving data that is overwritten, or otherwise unreadable due to tape damage. Additionally, such embodiments may improve the technology of tape drives by reducing the amount of damage to tapes from which such data is retrieved.

Example 15 includes the method of any one of examples 9 to 14, including or excluding optional features. In this example, the read position includes a segment number, where the tape includes a plurality of segments. such embodiments can reduce the time, financial, and other resources used on retrieving data that is overwritten, or otherwise unreadable due to tape damage. Additionally, such embodiments may improve the technology of tape drives by reducing the amount of damage to tapes from which such data is retrieved.

Example 16 includes the method of any one of examples 9 to 15, including or excluding optional features. In this example, the method includes determining the segment number based on a high resolution tape directory. such embodiments can reduce the time, financial, and other resources used on retrieving data that is overwritten, or otherwise unreadable due to tape damage. Additionally, such embodiments may improve the technology of tape drives by reducing the amount of damage to tapes from which such data is retrieved.

Example 17 is a computer program product. The computer program product includes in response to a request to recall data from a tape: starting to read a tape at a read position; determining that the tape includes a damaged region; determining a start position of the damaged region by skimming the tape; determining an end position of the damaged region by skimming the tape; reading between the read position and the start position of the damaged region; and reading between the end position of the damaged region and an end of data indicator for the data. such embodiments can reduce the time, financial, and other resources used on retrieving data that is overwritten, or otherwise unreadable due to tape damage. Additionally, such embodiments may improve the technology of tape drives by reducing the amount of damage to tapes from which such data is retrieved.

Example 18 includes the computer program product of example 17, including or excluding optional features. In this example, the method includes determining the read position based on a parameter of the request to recall data. such embodiments can reduce the time, financial, and other resources used on retrieving data that is overwritten, or otherwise unreadable due to tape damage. Additionally, such embodiments may improve the technology of tape drives by reducing the amount of damage to tapes from which such data is retrieved.

Example 19 includes the computer program product of any one of examples 17 to 19, including or excluding optional features. In this example, the method includes determining the read position based on a data identifier and a tape directory that maps the data identifier to a position of the tape. such embodiments can reduce the time, financial, and other resources used on retrieving data that is overwritten, or otherwise unreadable due to tape damage. Additionally, such embodiments may improve the technology of tape drives by reducing the amount of damage to tapes from which such data is retrieved.

Example 20 includes the computer program product of any one of examples 17 to 19, including or excluding optional features. In this example, the method includes determining that the request to recall data does not specify the read position; determining that the read position is not available in a tape directory; and determining the read position by skimming the tape. such embodiments can reduce the time, financial, and other resources used on retrieving data that is overwritten, or otherwise unreadable due to tape damage. Additionally, such embodiments may improve the technology of tape drives by reducing the amount of damage to tapes from which such data is retrieved.

What is claimed is:

1. A system comprising:
   one or more computer processing circuits; and
   one or more computer readable storage media having computer executable instructions that when executed cause the one or more computer-processing circuits to:
   determine that a request to recall data from a tape does not specify a read position;
   determine that the read position is not available in a tape directory;
   in response to the determining that the read position is not specified or available, determine the read position by skimming the tape;
   start to read the tape at the read position;

determine that the tape comprises a damaged region;
determine a start position of the damaged region by skimming the tape;
determine an end position of the damaged region by skimming the tape;
read between the read position and the start position of the damaged region; and
read between the end position of the damaged region and an end of data indicator for the data.

2. The system of claim 1, wherein a data identifier for the data is mapped by the tape directory to a position of the tape.

3. The system of claim 2, the one or more computer readable storage media having further computer executable instructions to:
determine that the mapped position is not valid; and
begin the determining the read position by skimming the tape from a current position of the tape.

4. The system of claim 1, wherein the read position comprises a wrap and a longitudinal position.

5. The system of claim 1, wherein the read position comprises a segment number of a high resolution tape directory, wherein the tape comprises a plurality of segments.

6. A method comprising:
in response to a request to recall data from a tape:
determining that the request does not specify a read position;
determining that the read position is not available in a tape directory;
in response to the determining that the read position is not specified or available, determining the read position by skimming the tape;
starting to read the tape at the read position;
determining that the tape comprises a damaged region;
determining a start position of the damaged region by skimming the tape;
determining an end position of the damaged region by skimming the tape;
reading between the read position and the start position of the damaged region; and
reading between the end position of the damaged region and an end of data indicator for the data.

7. The method of claim 6, wherein a data identifier for the data is mapped by the tape directory to a position of the tape.

8. The method of claim 7, further comprising:
determining that the mapped position is not valid; and
beginning the determining the read position by skimming the tape from a current position of the tape.

9. The method of claim 6, wherein the read position comprises a wrap and a longitudinal position.

10. The method of claim 6, wherein the read position comprises a segment number in a high resolution tape directory, wherein the tape comprises a plurality of segments.

11. A computer program product comprising one or more computer readable storage media having computer executable instructions that when executed cause on or more processors to:
determine that a request to recall data from a tape does not specify a read position;
determine that the read position is not available in a tape directory;
in response to the determining that the read position is not specified or available, determine the read position by skimming the tape;
start to read the tape at the read position;
determine that the tape comprises a damaged region;
determine a start position of the damaged region by skimming the tape;
determine an end position of the damaged region by skimming the tape;
read between the read position and the start position of the damaged region; and
read between the end position of the damaged region and an end of data indicator for the data.

12. The computer program product of claim 11, wherein a data identifier for the data is mapped by the tape directory to a position of the tape.

13. The system of claim 1, the one or more computer readable storage media having further computer executable instructions to store the start position of the damaged region and the end position of the damaged region.

14. The system of claim 13, the one or more computer readable storage media having further computer executable instructions to, in a subsequent read of the tape, determine the stored start and end positions before positioning the tape.

15. The system of claim 1, wherein:
the start position is approximate to an actual start of the damaged region; and
the end position is approximate to an actual end of the damaged region.

16. The system of claim 1, wherein the reading between the read position and the start position comprises:
reading from the read position to the start position; and
upon reaching the start position, reversing the tape and reading from the start position to an end of readable data between the read position and the start position.

17. The system of claim 16, the one or more computer readable storage media having further computer executable instructions to, upon reaching the end of the readable data between the read position and the start position, rotate the tape to the end position.

18. The method of claim 6, further comprising:
storing the start position of the damaged region and the end position of the damaged region; and
in a subsequent read of the tape, determining the stored start and end positions before positioning the tape.

19. The method of claim 6, wherein the reading between the read position and the start position comprises:
reading from the read position to the start position; and
upon reaching the start position, reversing the tape and reading from the start position to an end of readable data between the read position and the start position.

20. The computer program product of claim 11, further comprising computer executable instructions to:
store the start position of the damaged region and the end position of the damaged region; and
in a subsequent read of the tape, determine the stored start and end positions before positioning the tape.

* * * * *